United States Patent [19]
Owens et al.

[11] 3,807,074

[45] Apr. 30, 1974

[54] MICROFICHE VIEWER AND ACCESSORIES THEREFOR

[75] Inventors: Ben Howard Owens, Orange; Clyde Eugene Lefebre, Tustin; James Patrick Hagan, Laguna Beach, all of Calif.

[73] Assignee: Micrographic Technology Corporation, Santa Ana, Calif.

[22] Filed: Dec. 7, 1970

[21] Appl. No.: 95,770

[52] U.S. Cl. ................................ 40/159, 40/104.19
[51] Int. Cl. ............................................ G09f 1/10
[58] Field of Search ........ 40/152, 159, 64 A, 106.1, 40/104.19

[56] References Cited

UNITED STATES PATENTS

| | | | |
|---|---|---|---|
| 2,330,292 | 9/1943 | Knight et al. | 40/152 |
| 3,044,198 | 7/1962 | Badalich | 40/64 A X |
| 3,419,987 | 1/1969 | Hipp | 40/64 A X |
| 3,596,393 | 8/1971 | Lithgow | 40/159 |

*Primary Examiner*—Robert W. Michell
*Assistant Examiner*—Wenceslao J. Contreras
*Attorney, Agent, or Firm*—Nienow & Frater

[57] ABSTRACT

The present disclosure relates to apparatus for storing, reading out, and displaying data, particularly data of the microfiche type. It describes a carrier adapted to accept microfiche of various sizes and formats, a suitable magazine being used to store the standardized microfiche carriers. A readout device then selects, in a random access manner, a desired frame of a given microfiche, and displays this frame, enlarged, on a viewing screen.

7 Claims, 5 Drawing Figures

INVENTORS

BEN HOWARD OWENS
CLYDE EUGENE LEFEVRE
JAMES PATRICK HAGAN

BY Nienow & Frater

ATTORNEYS

INVENTORS

BEN HOWARD OWENS
CLYDE EUGENE LEFEVRE
JAMES PATRICK HAGAN

BY

Nienow & Frater
ATTORNEYS

MICROFICHE VIEWER AND ACCESSORIES THEREFOR

BACKGROUND

Because of the present day "information explosion", data is being accumulated at such a rapid rate that compact data storage systems are becoming ever more important. One of the most satisfactory data storage systems thus far devised is that of microfilming, wherein sheets of data, reports, books, blueprints, pictures, etc., are photographed in a photographically reduced size. Typically, an entire page then requires an area of about half an inch by five-eighths of an inch; these reduced size "frames" then being suitably assembled. This system results in a tremendous compaction of storage space requirements.

One of the early methods of assembling these reduced size frames was to position them, tandem-wise, on a reel of film; but this system had the disadvantage that it became difficult to have access to a single frame without somehow going through every frame that preceded it on the reel.

Another method of assembling the reduced size frames was to print related frames onto a given sheet of film; and this became known as "microfiche". In using the microfiche, a single frame is more readily retrieved when desired, this being designated as "random access" to the desired frame.

The microfiche, during its evolution, has taken a number of different sizes, but at the present time there tends to be a standardization. One of the most popular sizes is about one hundred and fifty millimeters long and about one hundred and five millimeters wide, and this size of microfiche may be designed to contain from about sixty to one hundred frames. Another popular size for microfiche is a film that is about five inches long and about three inches wide. Other sizes are still in use.

Similarly, the microfiche have taken a plurality of formats; the available one hundred frames being used for data, for titles, for coding, etc.

This diversity of microfiche has hindered the storing and retrieval of microfiche stored data. For example, one arrangement attached a notched metal clip to one edge of the microfiche, the notches being used for data retrieval. Another arrangement notched the actual edge of the microfiche film. Still another arrangement punched coding holes along the edge of the microfiche. Some other arrangements used optical approaches, and still other arrangements used markings to produce a frequency signal. The main disadvantage of these arrangements was that they required additional equipment and procedures for manufacturing each type of microfiche, and since each arrangement required a different retrieval apparatus, it was extremely difficult to intermix microfiche from different sources.

OBJECTS AND DRAWINGS

It is therefore the principal object of the present invention to provide an improved data holder and retriever.

It is another object of the present invention to provide an improved apparatus for selecting and reading the data on a microfiche.

It is still another object of the present invention to provide an improved microfiche carrier.

It is a further object of the present invention to provide an improved magazine for holding a plurality of the disclosed microfiche carriers.

It is a still further object of the present invention to provide an improved method of reading out the data on a microfiche.

The attainment of these objects, and others, will be realized from the following description, taken in conjunction with the drawings, of which FIG. 1 shows an improved microfiche carrier;

SYNOPSIS

Broadly stated, the present invention discloses a carrier that receives a microfiche into a transparent "pocket" of the carrier. A novel magazine stores a plurality of the microfiche carriers, detent means being used to lock the plurality of microfiche carriers in place in the magazine. In order to readout a given microfiche frame, the selected microfiche carrier is ejected from the magazine; and its selected frame is then positioned on to a viewing axis; at which time an enlarged display of the desired frame is presented on a viewing screen.

DESCRIPTION

Figure 1:
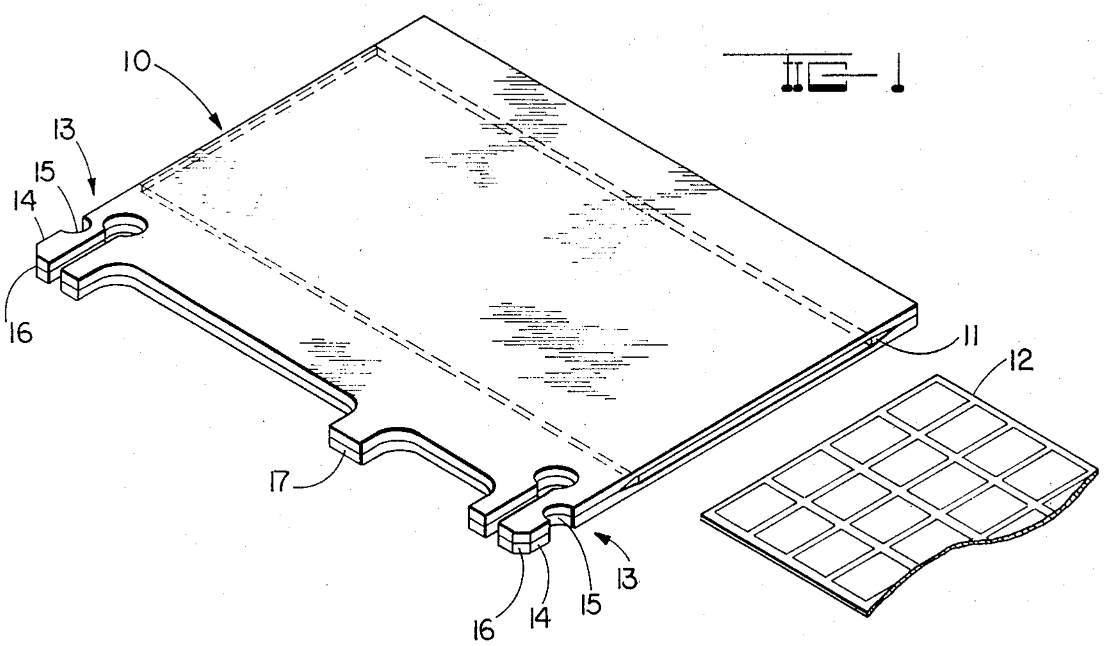

FIG. 1 shows a microfiche carrier 10 that takes the form of a "plate" having a transparent portion adapted to receive a microfiche 12. The carrier plate 10 may be formed in any suitable manner, such as by producing a pocket in a sheet of transparent material; but a preferred plate is produced by folding over or by juxtaposing a thin sheet of transparent slippery material, such as Mylar and bonding the edges. In any case, the resultant microfiche carrier is a relatively rigid plate containing a microfiche suitably positioned in its transparent portion.

It will be noted that microfiche carrier 10 has two detent elements 13, positioned at respective front corners thereof. The illustrated detent elements comprise an outer flexible leg 14 that can flex transversely, in the manner of a clothes-pin; this flexing movement being permitted by a hole-and-slot arrangement. Each flexible leg 14 has, on its outer edge, a detent concavity 15, and also has, at its outer end portion, a chamfer 16, both of these will be discussed later.

Microfiche carrier 10 is also illustrated as having a coding protrusion 17 on its front edge; the location of the coding protrusion varying on different microfiche carriers for reasons that will be more fully explained later.

Figure 2:
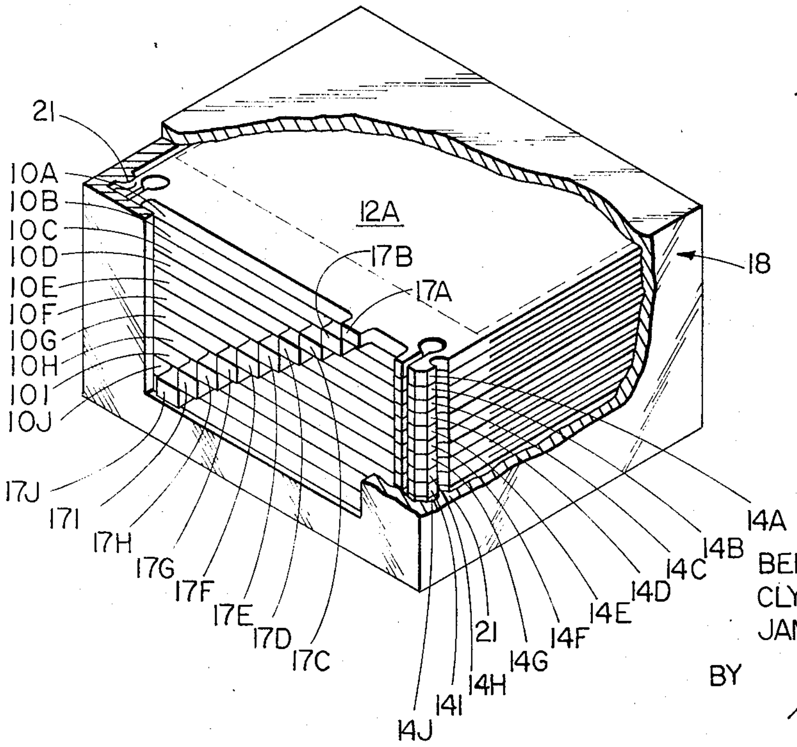
FIG. 2 shows a magazine containing a plurality of microfiche carriers.

In use, the composite carrier microfiche of FIG. 1 is placed, along with other composite carrier microfiche, in a magazine, and this arrangement will be understood from FIG. 2.

FIG. 2 shows a partially cutaway magazine 18 holding a plurality of microfiche carriers (10A, 10B, 10C, etc.) such as were shown previously; each individual carrier encompassing an individual microfiche 12A, etc. The individual microfiche carriers 10 lay on each other without separation. Magazine 18 may hold about thirty carriers, and be about five-eighths of an inch in height.

It will be realized that magazine 18 is loaded by sliding the microfiche carriers 10 into the back of the magazine, and when the front corner chamfers 16 of the flexible legs 14 abut a vertically extending protruding cylindrical configuration 21 on the magazine's side walls, the flexible legs 14 flex inwardly until the carrier movement causes the cylindrical detent element 21 to engage the detent concavity 15 of the flexible leg. The mutual engagement of the two detent elements 15 and 21 holds each microfiche carrier 10 securely in place in the magazine 18.

It will be noted from FIG. 2 that the coding protrusions 17A, 17B, 17C, etc. of the various microfiche carriers extend outwardly through a window portion of the front wall of the magazine. These coding protrusions are short enough so that they do not extend beyond the limits of the magazine. Moreover, the various coding protrusions are shown to be staggered, and the reason for this will be more fully explained later.

As indicated above, the disclosed invention permits various microfiche sizes and formats to be used with a standard carrier, and this use of a standard microfiche carrier permits the intermixing of microfiche from different sources.

Figure 3:
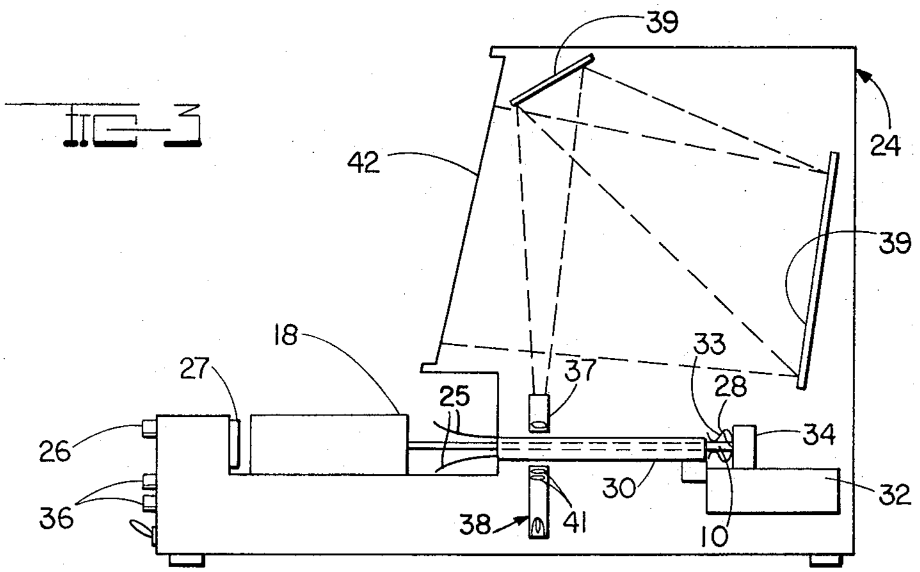
FIG. 3 shows a schematic view of apparatus for positioning and reading out a desired frame.

The loaded carrier 18 may now be inserted into a retrieval readout device, as illustrated in FIG. 3.

FIG. 3 shows a retrieval/display unit 24 for reading out the data on a given frame of the stored microfiche. To do this, the previously discussed loaded magazine 18 is positioned in unit 24, and a selection control, such as a knob or a switch 26 is set to select a desired microfiche carrier from the plurality of microfiche carriers stored in the magazine 18. At this time, a vertically-oriented pusher bar 27 is powered to move transversely to a selected location, and the front surface of the pusher bar 27 abuts one of the coding protrusions 17 previously discussed (see FIG. 2), and thus selects the desired microfiche carrier.

Alternatively, the selection of the microfiche carrier may be performed manually, electrically, automatically as by the use of a computer, etc. In this way, any desired microfiche may be selected, thus providing random access to the stored data.

Once the pusher bar 27 is activated, it moves forward, and this forward movement is forcible enough to disengage the detents 13 of the selected microfiche carrier. In this way, the selected carrier is ejected out of the back side the magazine 18. As the now leading end 28 of the selected microfiche carrier 10 emerges from the back of the magazine, it enters a pair of vertically converging spring guides 25 that guide the leading edge 28 to a pair of horizontally spaced apart longitudinal guides 30 that receive the longitudinal edges of the microfiche carrier 10. It should be noted that the trailing edge of the microfiche carrier never leaves the magazine.

The spaced apart longitudinal guides 30 are mounted by any suitable means to a well-known X–Y mechanism 32; this being a device that is capable of producing both longitudinal and transverse movements.

Simultaneously, with the ejection of the selected microfiche carrier 10 from the back of the magazine 18, the leading end 28 of the microfiche carrier 10 is engaged by a pair of spring clamps 33 that are also mounted, by brackets 34, to X–Y mechanism 32.

Thus, as the selected microfiche carrier is ejected from the back side of the magazine, its leading end is grasped by a pair of spring clamps, and its longitudinal edges are supported by a pair of spaced apart longitudinal guides; that location of the selected microfiche carrier being designated as the viewing station.

The previous discussion pointed out that each microfiche contained a plurality of reduced size frames, and that it was desired to study a given one of these frames. To achieve this result, positioning controls, such as switches or knobs 36 are now set in accordance with the location of the desired frame on the microfiche, and, in a manner to be discussed later, the controls causes the spring clamps 33 and its associated mounting bracket 34 to be moved longitudinally by the X–Y mechanism—pulling or pushing the microfiche carrier to a desired position on the viewing station. At this desired position, the column of frames containing the desired frame is now located on a viewing axis produced by a projection lens 37. If the desired frame is not centrally located at this time, the X–Y mechanism 32 produces transverse movement of the magazine 18, the longitudinal guides 30, and the clamped microfiche 10; the transverse movement being in a direction and amount that positions the desired frame directly beneath the projection lens 37.

A manual control may be provided, if desired, for the positioning and/or for the overriding of the automatic X–Y positioning.

When the desired frame of the microfiche is suitably positioned, a projection system 38, using a plurality of mirrors 39 and lenses 41, produces an elongated image of the frame on a viewing screen 42. It should be noted that regardless of the vertical position of the carrier in the magazine, the slipperiness and flexibility of the carrier permit guides 25 and 30 to position the microfiche in the object plane of lens 37. In this way, a microfiche carrier is selected, and a given frame thereof is projected, enlarged, on to a viewing screen. A printout may be provided by suitable well-known equipment.

When the data retrieval has been completed, the microfiche carrier is returned to magazine 18 as follows. Resetting the position control knob 36 causes the X–Y mechanism to return the magazine 18 and microfiche carrier 10 to the eject position. As it does so, it drives the microfiche carrier 10 back into magazine 18, and this inward movement causes the flexible leg 14 of the microfiche carrier to flex inwardly when its chamfer abuts the cylindrical protrusion of the magazine's side wall so that the detent arrangement again locks the microfiche carrier into the magazine. It may be desirable to provide a solenoid operated finger to securely seat the returned carrier.

The X–Y mechanism 32 now backs away from the magazine 18, and as it does so, its spring clamps 33 release the microfiche carrier to the more powerful holding action of the magazine's detents.

Figure 4:
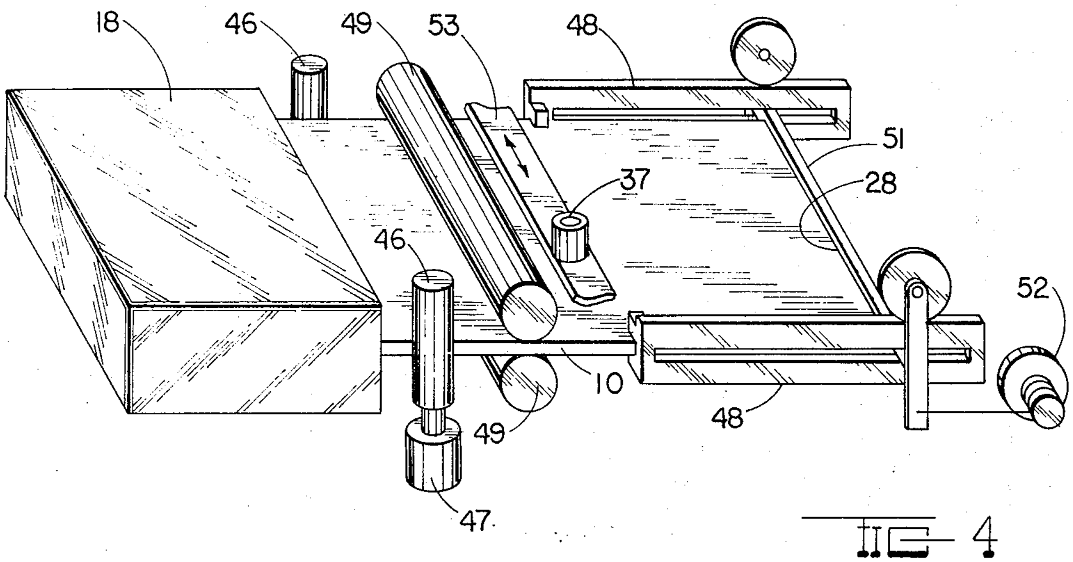
FIG. 4 shows another arrangement for positioning a desired frame.

FIG. 4 shows another microfiche carrier positioning arrangement. In this illustration, when the microfiche carrier 10 is ejected from the back of the magazine 18 as previously discussed, the now exposed longitudinal edges of the microfiche carrier are engaged—frictionally or otherwise—by a pair of spaced-apart drive rollers 46. These are turned by means such as a drive motor 47 in a direction that moves the microfiche carrier further out of the magazine to the viewing station. As in the previous discussion, the longitudinal edges of the microfiche carrier 10 are received by a pair of spaced-apart guides 48 that, in this embodiment, are fixedly positioned, so that the microfiche carrier 10 slides longitudinally in guides 48.

As the microfiche carrier 10 moves progressively outward from the magazine 18, additional driving means 49, suitably synchronized electrically or mechanically with drive rollers 46, may be used to improve the carrier movement.

A spring-loaded longitudinally movable follower arm 51 abuts the leading end 28 of the microfiche carrier 10, and therefore assumes a longitudinal position conforming to the location of the microfiche carrier 10. As indicated, the follower arm 51 is coupled to a feedback potentiometer 52 whose electrical value is varied as the follower arm 51 moves. Thus, the electrical variation of the feedback potentiometer 52 always indicates the longitudinal location of the microfiche carrier 10, and it will be shown later how the instantaneous value of the feedback potentiometer may be used to control the movement of the microfiche carrier 10.

Thus, the microfiche may be longitudinally positioned by suitably setting the position controls discussed previously.

In the embodiment of FIG. 4, the microfiche carrier 10 is not moved transversely, rather the equivalent effect is obtained optically. This result is achieved by moving the projection lens 37 in a transverse direction in order to position the viewing axis directly above the desired frame of the microfiche. Many such transverse moving mechanisms are known, one extremely simple mechanism for achieving this result comprising the mounting of the projection lens 37 on a transversely movable belt 53.

In this way, the apparatus of FIG. 4 produces an enlarged display of the desired frame. As discussed above, manual control, electric positioning, computer control, and/or a manual override may be provided, if desired.

Depending upon the optical system employed, the transverse movement of the projection lens may displace the display; and if this displacement is undesirable, a compensation may be introduced by displacing the lens from the true center of the object frame, by inserting of optical element such as prisms, or by incorporating a mechanical linkage that adjusts the mirror angle, etc.

Referring back to FIG. 4, when the data retrieval has been completed, the microfiche carrier 10 is returned to magazine 18 by reversing the rotation of the drive means, this operation placing the microfiche carrier 10 in its original ejected position. In order to drive the microfiche carrier 10 back into the magazine, the drive rollers 46 may be mounted on swingable pivot arms; and as the rollers reach the corners of the carrier, the pivot arms swing inwardly under spring pressure—permitting these rollers to drive the carrier completely back into the magazine. Alternatively, a somewhat different type of detent element may be used. This comprises a toggle type compression spring of the kind that is used in electrical switches to position the handle in either the on or the off position. In the present case, individual such springs are used for each microfiche carrier, and these replace the previously discussed cylindrical protrusion.

Each individual compression spring is anchored to the side wall of the magazine, and as the detent concavity of the microfiche carrier engages the spring, the spring first contracts, and then expands to drive the microfiche carrier 10 to its locked position in the magazine.

Figure 5:
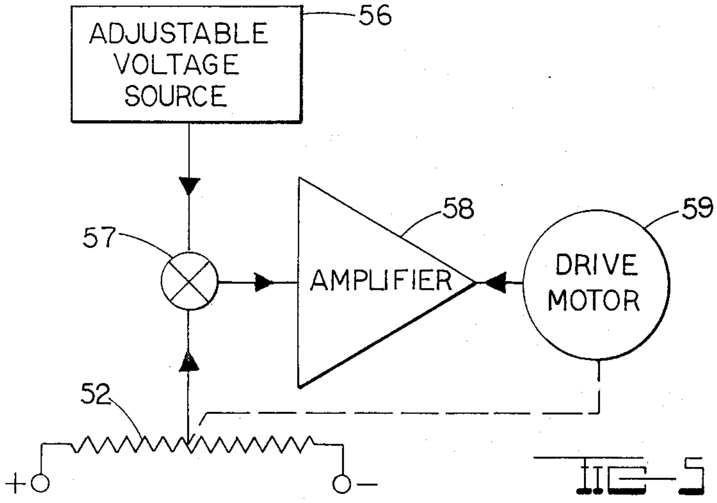
FIG. 5 shows an electrical circuit for the positioning arrangement.

It was pointed out above that the microfiche carrier may be positioned manually—or more conveniently—electrically, and many electrical circuits are known for achieving this result. One such electrical circuit is shown in FIG. 5. This illustrates a source 56 of control voltage such as may be obtained from a potentiometer associated with the previously discussed knobs or obtained from switches connected to voltage dividers or the like. The control voltage from source 56 is applied to an input terminal of a summing network 57, and simultaneously, a feedback voltage obtained from another source, such as the feedback potentiometer 52, is applied to another input terminal of the summing network 57. It should be noted that in the present case, the control voltage from the control knob remains constant for that particular knob-setting; whereas the feedback voltage from the feedback potentiometer varies with the position of the microfiche carrier.

The operation of the summing network 57 is such as to compare the values of the two voltages applied to its input terminals, and to produce an output signal that corresponds to the difference between these two input signals, the difference between these two input signals being known as the "error signal", since it indicates that the "error" between the desired location of the microfiche carrier (as indicated by the control voltage) and the actual location of the microfiche carrier (as indicated by the feedback voltage).

For example, assume that the control knob is set to position the microfiche carrier at a particular location so that the potentiometer or switch associated with this control knob produces a given control voltage of say, five volts. This control voltage remains constant for that setting of the knob, and is applied to the summing network. At the instantaneous location of the microfiche carrier, the feedback potentiometer may be producing a feedback voltage of, say zero volts.

Since the control voltage (five volts) is appreciably different from the feedback voltage (zero volts) the difference, or error voltage, of five volts applied to the summing network 57 is amplified in amplifier 58, and a resultant large output signal of a given polarity is applied to drive motor 59. Drive motor 59 therefore rotates in a given direction to decrease the error signal, thus moving the microfiche carrier 10 closer to its desired location.

As the now moving microfiche carrier changes its location, its associated feedback potentiometer produces an ever-changing feedback voltage, and as the microfiche carrier approaches the desired location, the feedback voltage approaches the value of the control voltage. When the microfiche carrier reaches the desired location, the feedback voltage equals the control voltage, and the error signal applied to the summing network 57 drops to zero. At this time, the drive motor stops rotating, the carrier remaining at the desired location.

If, per chance, the microfiche carrier had overshot the desired location, the new feedback voltage would have produced an error signal of a different polarity and value, and this would have reversed the direction of rotation of the drive motor, and would have corrected the overshoot.

As indicated, many such circuits are known so that positioning of the carrier is easily accomplished in both the vertical longitudinal and transverse directions.

SUMMARY

The disclosed invention provides many advantages over prior art systems. First of all, it protects individual microfiche. Second, the disclosed microfiche carrier permits the intermixing of microfiche having differing sizes and formats. Third, it permits the selection and display of any selected frame, in a random access manner. Fourth, it permits unlimited storage by having the magazines separate from the readout and display device, and permits the magazine to assume any reasonable size. Fifth, the file integrity is protected, because the microfiche is not readily accessible without the aid of special equipment. Sixth, the data is easily updated by removing a given microfiche carrier and replacing it with an updated microfiche. Seventh, at no time does the microfiche carrier come completely out of the magazine; this feature eliminating the prior art complex and troublesome mechanism for reinserting a carrier into a predetermined position in a stack of carriers. It will also be realized that due to the vertically oriented pusher bar, and the protrusions, it is no longer necessary for a carrier to have a predetermined position in the stack. Thus, a new carrier can be placed at the top of the stack; and is readily available for random access readout.

While the invention has been explained in terms of use with a microfiche, it is to be clearly understood that the principles disclosed are not limited to micro images of textual information or even pictorial subject matter.

We claim:

1. A microfiche carrier comprising:

a plate having a transparent portion;

pocket means, in said transparent portion, for receiving a microfiche;

the in-facing surfaces of said pocket means being flexibly adapted and variably spaced to make contiguous surface-to-surface contact with respectively adjacent surfaces of said received microfiche;

detent means comprising a flexible leg on said carrier plate, for holding said carrier plate in a suitable magazine.

2. The combination of claim 1 wherein said plate comprises two sheets of thin, flexible, slippery material having at least superposed portions thereof transparent, the front edges of said sheets being affixed to each other, the variable space between said flexible transparent portions of said sheets forming said pocket for receiving said microfiche.

3. The combination of claim 1 wherein said flexible leg has a detent concavity in one edge thereof.

4. The combination of claim 1 wherein said detent means comprises a pair of flexible legs positioned at the front corners of said carrier plate, each said carrier plate having a detent concavity in one edge thereof, said flexible legs being formed by a slot configuration.

5. The combination of claim 2 including a coding protrusion positioned on the front edge of said carrier plate.

6. A microfiche carrier comprising:

a plate having a transparent portion;

pocket means, in said transparent portion, for receiving microfiche;

a flexible leg detent element located at the front corners of said carrier plate, each said flexible leg having a detent concavity positioned on an edge thereof, said flexible legs being formed by a hole and slot configuration for providing sufficient flexibility to permit another type of detent element to engage said detent concavity;

coding means, comprising a protrusion positioned on the front edge of said carrier plate, for distinguishing one carrier plate fron another carrier plate.

7. A microfiche carrier comprising:

a plate having a rigidified front portion and a transparent rear portion;

said rigidified front portion of said plate being formed by the joined front edges of a pair of coextensive flexible sheets of transparent material;

said transparent rear portion of said plate being formed by the variable spacing of the unjoined surfaces of said pair of coextensive sheets of flexible transparent material;

pocket means, in said transparent rear portion of said plate, for receiving said microfiche;

said pocket means being formed by said variable spacing of the in-facing surfaces of said unjoined portions of said flexible transparent material;

the in-facing surfaces of said transparent flexible sheets being adapted to mate in a surface-to-surface contiguous matter with the respectively adjacent surfaces of said received microfiche;

detent means comprising a flexible leg at said rigidified front portion of said carrier plate, for holding said carrier plate in a suitable magazine.

* * * * *